UNITED STATES PATENT OFFICE

HAROLD H. STEINOUR, OF RIVERSIDE, CALIFORNIA, ASSIGNOR TO RIVERSIDE CEMENT COMPANY, OF LOS ANGELES, CALIFORNIA, A CORPORATION OF CALIFORNIA

METHOD OF MAKING PORTLAND CEMENT

No Drawing.    Application filed September 30, 1929.    Serial No. 396,394.

This invention relates to the manufacture of Portland cement and the principal object thereof is to provide a novel and advantageous method for making Portland cement having a higher proportion of combined lime than the Portland cements ordinarily produced, and possessing certain advantageous properties as a result of such high proportion of combined lime.

Portland cement consists chiefly of compounds of lime and alumina, principally in the form of tricalcium aluminate $$(3CaO.Al_2O_3),$$

and compounds of calcium and silica, principally in the form of tricalcium silicate $$(3CaO.SiO_2)$$

and beta-dicalcium silicate $(2CaO.SiO_2)$. It will be understood that the alumina may be partly replaced by iron oxide, which appears in the finished cement chiefly in the form of tetra-calcium alumino-ferrite $$(4CaO.Al_2O_3.Fe_2O_3),$$

or possibly some other ferrite.

The desired mixtures of these compounds are ordinarily formed by mixing together suitable raw materials in such proportions as to provide the desired proportions of lime, silica, alumina, and iron oxide, and burning the same. The lime is substantially the sole basic constituent, except for magnesia, which is generally present to a greater or less extent while the silica, alumina and iron oxide are all acidic in nature, and react with the lime upon heating. The raw material in some cases consists of so-called "cement rock" containing substantially the desired proportions of these constituents, but in most cases consists of a mixture of limestone, or limestone-bearing material containing a considerably higher proportion of lime than the finished cement, and clay or shale (argillaceous or clayey material) consisting principally or largely of silicates of aluminum and iron. Other materials containing varying proportions of silica, alumina, and iron oxide may also be used as sources of acidic constituents.

In ordinary Portland cements heretofore produced there has, in general, been a considerable proportion of dicalcium silicate, for example, about half as much as of the tricalcium silicate, due to the fact that the proportion of lime ordinarily used in the raw mix is insufficient to entirely convert the dicalcium compound to the tricalcium compound. Furthermore, it has been found that in the ordinary process of making Portland cement by a single burning of the mixed raw materials, if the proportion of lime is increased in an attempt to increase the conversion of the dicalcium silicate to the form of tricalcium silicate, it is impossible to obtain complete combination of the lime, so that some free lime remains in the finished cement, such free lime having a very deleterious effect on the properties thereof.

However, for certain purposes, and particularly for the production of Portland cement having high early strength, it is desirable to increase the proportion of combined lime in the finished cement, that is, to increase the proportion of high lime compounds, and particularly to produce a cement having a relatively high proportion of tricalcium silicate as compared to the dicalcium silicate, since the tricalcium compound has much more desirable cementing properties than the dicalcium compound, particularly from the standpoint of early development of strength.

It has already been proposed to effect the combination of a higher proportion of lime in the cement by first burning a mixture of materials containing lime, silica, alumina and iron oxide in which the proportion of lime is sufficient to substantially fully saturate the other constituents so as to form a product similar in composition of its combined constituents to the usual Portland cement clinker, but also containing a certain amount of free or uncombined lime, and to then cool and grind this product and re-heat the same to cause this free lime to combine and complete the saturation of the other constituents. It has also been proposed to first burn a mixture of lime, silica, alumina and iron oxide in substantially the proportions of ordinary Portland cement, and to then cool and grind the product and to re-burn the same together with an added amount of lime sufficient to complete the saturation of the other constituents during the second burning operation. The expression "fully saturate" is understood to mean the complete conversion of the components to forms containing the highest proportions of lime, that is, to tricalcium silicate, tricalcium aluminate and tetra-calcium alumino ferrite.

An important advantage of these methods of double burning, with an intervening grinding, as compared with single burning, is that fresh surfaces of uncombined material are exposed, so as to give such material a further chance to react during the second burning, it being assumed that the inability to cause the desired high proportion of lime to combine during a single burning is largely due to the tendency of the material to sinter together to form lumps during the clinkering operation, thus preventing or inhibiting further reaction of material in the interior portions of such lumps, and also to the formation of surface layers of reaction products at the surfaces of the original particles themselves, which tends to prevent access of other materials to the interior of such particles. The re-grinding not only breaks up the lumps formed during the first burning, but also breaks up some of the original particles themselves, both of these results serving to expose fresh surfaces of material for reaction during the second burn. Another advantage of such re-burning operation, which is realized when the addition of other material between the first and second burns is practiced, is greater flexibility of control due to the fact that the proportioning of constituents is obtained in two stages, and an error or irregularity in the mix for the first burning operation may be corrected in making the mix for the second burning operation. Advantages which the method of reburning with addition of material between burns has with respect to reburning without such additions are greater capacity and probably greater economy due to the fact that the added material has to go through the kiln only once. A further advantage is that the presence of an excess of certain of the constituents during the first burning may, under certain conditions, produce greater combination of the bulk of the material during that operation than would otherwise result.

I have found, however, that the formation of high early strength cements having a relatively high proportion of combined lime may also be carried out by another process which differs essentially from the method of reburning without addition of material between burns, and from that in which lime is added between burns, but which possesses the advantages just listed and in addition certain other ones of an important character. This novel and advantageous method consists essentially in first burning a material or mixture of materials containing lime and acidic constituents, such as silica, alumina and iron oxide, in which the proportion of lime is in excess of that which can be made to combine with the acidic constituents of the original mix even by repeated burning, then cooling and grinding the product of this first burning, and then reburning the same, together with added acidic cement forming material such as silica, alumina and iron oxide either alone or in combination, said added material being free from lime or relatively low in lime.

The process according to this invention may be carried out by first mixing and grinding limestone and argillaceous material in such proportions that the lime content of the mix is more than can be made to combine, even by repeated burning, with the silica, alumina and iron oxide therein. The resulting raw mix may, for example, show the following analysis upon ignition:

| | Per cent |
|---|---|
| Lime (CaO) | 73.0 |
| Magnesia (MgO) | 2.0 |
| Silica ($SiO_2$) | 18.0 |
| Alumina ($Al_2O_3$) | 5.0 |
| Iron oxide ($Fe_2O_3$) | 2.0 |

These mixed materials may then be burned in the usual manner of making Portland cement. In this first burning operation the high proportion of lime may, by reason of mass action, cause the formation of a larger proportion of high-lime compounds, and particularly tricalcium silicate, than in the ordinary burning of Portland cement, but as the amount of lime present not only exceeds the amount which will combine in a single burning operation, but actually exceeds the proportion which may be made to combine with the other constituents even by repeated burning, there will inevitably be a considerable amount of free or uncombined lime remaining in the product of this first burn. The silica, alumina and iron oxide, however, will be substantially completely combined with lime, the various compounds thereof being either in substantially the same proportions as in ordinary Portland cement clinker or containing somewhat higher proportions of the high lime compounds.

The clinkered material produced by this first burning operation may then be cooled and reground, and thoroughly mixed with an additional quantity of acidic cement-forming material, for example, argillaceous material containing sufficient silica, alumina and iron oxide to combine with the excess of lime used in the original mix. For example, I may add, for each thousand pounds of clinker resulting from the first burn and containing substantially the proportions of lime, silica, alumina and iron oxide as given above for the original raw mix, sixty pounds of argillaceous material having the following analysis upon ignition:

| | Per cent |
|---|---|
| Silica ($SiO_2$) | 72.0 |
| Alumina ($Al_2O_3$) | 20.0 |
| Iron oxide ($Fe_2O_3$) | 8.0 |

The corrected mix would then have the following analysis upon ignition:

| | Per cent |
|---|---|
| Lime (CaO) | 68.86 |
| Magnesia (MgO) | 1.89 |
| Silica ($SiO_2$) | 21.06 |
| Alumina ($Al_2O_3$) | 5.85 |
| Iron oxide ($Fe_2O_3$) | 2.34 |

The mixing of the additional acidic material with the material resulting from the first burning operation may be carried out either before, during, or after the grinding of the burned material. For example, the once burned clinker and the additional acidic material may be ground separately and then mixed, or they may be first mixed and then ground together. This corrected mix may then be subjected to a second burning operation, which may be carried out in a rotary kiln or other suitable heating apparatus, and in a manner similar to the ordinary burning operation except that, since all of the lime has already been once burned and hence converted from the form of $CaCO_3$, it is unnecessary to provide for any further liberation of $CO_2$ before actual combination begins. A particular advantage of this method, therefore, is that the material added between the first and second burns is in a form which can begin to combine at once. For this reason, as soon as the materials are heated to the proper temperature the combination of lime with the other constituents can take place immediately, which leads to more rapid and complete reaction than when the lime is present as limestone and must first lose its $CO_2$ before it can begin to combine with anything else.

During this second burning operation part of the lime will combine with low-lime compounds resulting from the first burn, to convert them to high-lime compounds, namely, tricalcium silicate, tricalcium aluminate, and tetra-calcium alumino ferrite, while the remainder of the lime will combine with the silica, alumina and iron oxide of the added material, to also form principally high-lime compounds. This ability of the lime to form principally high lime compounds from the constituents added between the first and second burns, as well as to react readily with low-lime products of the first burn, may be due, in part at least, to the above mentioned fact that such lime is already in condition to combine and does not require liberation of $CO_2$ therefrom. Furthermore, the combination of alumina, iron oxide and silica with lime takes place much more readily than the combination of dicalcium silicate with lime to form tricalcium silicate, which is another reason why combination of the added constituents would be expected to take place readily during the second burn. This ability of the added acidic material to combine readily with the remaining lime during the second burn constitutes an important advantage of this invention, and serves to clearly distinguish this method from the other reburning methods above mentioned, in which the only possible reaction of lime during the second burning is the formation of higher lime compounds from low-lime compounds, which reactions take place with relatively great difficulty.

The clinker resulting from the second burn may then be cooled and ground, to form finished cement, it being understood that gypsum or any other suitable materials may be added thereto in the same manner as in making ordinary Portland cement.

A particularly advantageous application of this invention is in connection with the manufacture of Portland cement from raw materials having approximately the requisite proportions of the essential elements for making Portland cement but being somewhat high in lime. Certain "cement rocks" such as those occurring in certain parts of Pennsylvania are of this type, containing over 75% carbonate of lime, so that in the manufacture of Portland cement therefrom it is necessary to add a little clay, or other cement rock containing less than the required amount of lime. In applying my invention to such materials it would be unnecessary to employ any mixing operation preceding the initial burn. The high-lime cement rock or other high-lime raw material may be simply ground and burned and the product of this first burn may then be cooled, re-ground and mixed with the required amount of argillaceous material or material low in lime, and then re-burned.

Furthermore, in cases where Portland cement is made from a three component mix, in which two of the components are clay or argillaceous material or other low-lime material, one of the argillaceous components may be mixed with the limestone prior to the initial burn while the other argillaceous components may be added between the first and second burns, or different proportions of the two argillaceous components may be added at these two different points in the process.

Still another adaptation of the process consists in first burning a mixture of limestone and argillaceous material, said mixture being higher in lime than the finished cement is to be, and being deficient in one of the acidic constituents, for example, iron oxide, and then supplying this deficiency by adding, between the first and second burns, material consisting wholly or largely of iron oxide and in sufficient proportion to cause all the lime to go into combination during the second burn.

While I have mentioned certain compounds as being the ones probably formed during the production of Portland cement, it is to be understood that the invention is not to be restricted to the formation of these particular compounds. The essential features of the invention are the use of an initial raw mix containing a higher proportion of lime than can be made to fully combine with the acidic constituents thereof even by repeated burning, and the addition of acidic material, between the first and second burn, in sufficient amount to cause substantially complete combination of the lime during the second burn. While mention is made of the formation of a larger proportion of high-lime compounds than are ordinarily formed in making Portland cement by a single burn, and particularly to the conversion of the silica more fully to the form of tricalcium silicate, it is to be understood that the invention is not restricted to complete "saturation" of the final product with respect to lime, that it, to complete conversion of all of the constituents to their higher lime compounds. Assuming that the compounds formed are as given above, the actual proportions of constituents in the specific example which I have given are such as to provide about 2% dicalcium silicate in the final clinker, the remainder of the silica being combined as tricalcium silicate, but I do not wish to be limited in any way to any specific composition of the material used in the first burn, or that added between the first and second burns, or to any certain degree of conversion of the constituents to higher lime compounds.

I claim:

1. The method of making Portland cement which comprises first burning material containing lime, silica, alumina and iron oxide, in which the proportion of lime is in excess of that which will combine, even on repeated burning, with the silica, alumina and iron oxide contained therein, permitting the resultant product to cool, grinding said product and mixing therewith material containing sufficient silica, alumina and iron oxide to combine with the excess lime, and reburning the mixture.

2. The method of making Portland cement having a high proportion of combined lime which comprises first burning cement forming material containing lime together with argillaceous material in sufficient amount to combine with a considerable proportion but not all of said lime during such burning operation, then cooling and grinding the product resulting from this first burning operation and mixing therewith additional argillaceous material to give a mixture of lower lime content than the material in the first burning operation, and then reburning said mixture.

3. The method of making Portland cement which comprises mixing an argillaceous material containing silica, alumina and iron oxide, with limestone material containing lime in excess of that which will combine, even on repeated burning, with said components of the argillaceous material, burning said mixture, then cooling and grinding the burned product and mixing with said product argillaceous material to form a mixture of lower lime content than the mixture in the first burning operation, and then subjecting the mixture so formed to a second burning operation.

4. The method of making Portland cement which comprises first burning material containing lime and also containing acidic constituents of Portland cement, in amount sufficient to combine with a considerable proportion of said lime during such burning but insufficient to combine with all of said lime even on repeated burning, then cooling and grinding the product of this first burning operation and mixing therewith additional acidic cement-forming material, and then reburning the mixture, said additional acidic material being in sufficient proportion to cause substantially complete combination of the lime during said reburning operation.

5. The method of making Portland cement which comprises mixing argillaceous material with lime-bearing material containing lime in excess of that which will combine with the acidic constituents of the mixture even on repeated burning, burning said mixture, cooling and grinding the burned material and mixing therewith sufficient additional acidic cement-forming material to cause substantially complete combination of the lime upon further burning, and reburning the mixture.

6. In the production of Portland cement the steps which comprise mixing a Portland cement clinker consisting of calcium compounds of silica, alumina and iron oxide, and of uncombined lime in excess of that which can be combined with said calcium compounds by further burning to form higher lime compounds, with argillaceous material containing sufficient acidic cement forming material to cause substantially complete combination of said excess lime upon further burning, and then burning said mixture.

In testimony whereof I have hereunto subscribed my name this 23rd day of September, 1929.

HAROLD H. STEINOUR.